(12) United States Patent
Takata et al.

(10) Patent No.: US 9,054,588 B2
(45) Date of Patent: Jun. 9, 2015

(54) THREE-PHASE AC TO DC CONVERTER AND AIR CONDITIONING APPARATUS USING THREE-PHASE AC TO DC CONVERTER

(75) Inventors: Masaki Takata, Tokyo (JP); Shigeo Takata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 161 days.

(21) Appl. No.: 13/822,705

(22) PCT Filed: Oct. 13, 2010

(86) PCT No.: PCT/JP2010/006076
§ 371 (c)(1),
(2), (4) Date: Mar. 13, 2013

(87) PCT Pub. No.: WO2012/049706
PCT Pub. Date: Apr. 19, 2012

(65) Prior Publication Data
US 2013/0181646 A1    Jul. 18, 2013

(51) Int. Cl.
*H02P 6/00*    (2006.01)
*H02M 7/219*    (2006.01)
(Continued)

(52) U.S. Cl.
CPC .............. *H02M 7/219* (2013.01); *H02M 1/12* (2013.01); *H02M 7/066* (2013.01); *H02P 27/06* (2013.01); *H02P 27/08* (2013.01)

(58) Field of Classification Search
CPC ............ H02P 6/085; H02P 1/42; H02K 17/08
USPC .................... 318/400.29, 430, 431, 432, 433; 319/779; 363/89
See application file for complete search history.

(56) References Cited

U.S. PATENT DOCUMENTS

2008/0309282 A1*  12/2008  Morris et al. ................. 318/779
2010/0309700 A1   12/2010  Maeda et al.

FOREIGN PATENT DOCUMENTS

CN    101584107 A    11/2009
CN    101933219 A    12/2010
(Continued)

OTHER PUBLICATIONS

International Search Report of the International Searching Authority mailed Jan. 18, 2011 for the corresponding international application No. PCT/JP2010/006076 (with English translation).
(Continued)

*Primary Examiner* — Karen Masih
(74) *Attorney, Agent, or Firm* — Posz Law Group, PLC

(57) ABSTRACT

A three-phase AC to DC converter includes a three-phase AC power supply, a three-phase rectifier bridge circuit that is connected to the three-phase AC power supply and includes rectifying devices which are connected in a bridge configuration, a three-phase full-bridge circuit that includes two serially-connected switching devices for each of three phases, the two serially-connected switching devices being connected at an output side of the three-phase rectifier bridge circuit, and includes reverse blocking diodes which are connected in parallel to the respective switching devices, a reactor that connects the three-phase full-bridge circuit to the three-phase AC power supply, a smoothing capacitor connected to an output side of the three-phase full-bridge circuit, DC voltage detection means that detects an output voltage, power supply phase detection means that detects a power supply phase of the three-phase AC power supply, and pulse width modulator that outputs PWM signals which control the switching devices.

10 Claims, 6 Drawing Sheets

(51) Int. Cl.
  *H02M 1/12* (2006.01)
  *H02M 7/06* (2006.01)
  *H02P 27/06* (2006.01)
  *H02P 27/08* (2006.01)

(56) References Cited

FOREIGN PATENT DOCUMENTS

| EP | 2 107 675 A1 | 10/2009 |
| JP | 07-308069 A | 11/1995 |
| JP | 2001-320882 A | 11/2001 |
| JP | 2009-183115 A | 8/2009 |

OTHER PUBLICATIONS

Office Action mailed Feb. 18, 2014 issued in corresponding JP patent application No. 2012-538476 (and English translation).

Office Action dated Oct. 10, 2014 issued in corresponding CN patent application No. 201080069568.9 (and English translation).

* cited by examiner

○ : PWM
● : REACTOR THROUGH WHICH CURRENT FLOWS WHEN IN "ON" STATE

THREE-PHASE AC TO DC CONVERTER AND AIR CONDITIONING APPARATUS USING THREE-PHASE AC TO DC CONVERTER

CROSS REFERENCE TO RELATED APPLICATION

This application is a U.S. national stage application of PCT/JP2010/006076 filed on Oct. 13, 2010.

TECHNICAL FIELD

The present invention relates to a three-phase alternating current (AC) to direct current (DC) converter that converts three-phase AC power to DC power, and an air-conditioning apparatus using the three-phase AC to DC converter.

BACKGROUND ART

In general, industrial air-conditioning apparatuses larger than domestic air-conditioning apparatuses use three-phase AC power. In such an industrial air-conditioning apparatus, an inverter is usually used to drive a load, such as a motor, provided in the air-conditioning apparatus. Since the input to the inverter needs to be DC voltage, it is necessary to convert three-phase AC power to DC power.

There have been proposed various apparatuses that convert three-phase AC power to DC power. For example, Patent Literature 1 discloses a boost three-phase full-wave rectifier that includes a circuit breaker capable of disconnecting three-phase AC power, a current detector configured to detect phase currents flowing through respective phase lines, boost inductors provided for the respective phase lines, a three-phase full-wave rectifying circuit including switching semiconductor devices connected in a three-phase bridge configuration, a smoothing capacitor, and a control circuit configured to perform high-frequency switching of the switching semiconductor devices according to a predetermined sequence. In this boost three-phase full-wave rectifier, diodes are connected so as to form a three-phase bridge circuit in which the phase lines between the circuit breaker and the respective boost inductors serve as inputs thereof, and positive and negative common lines of the three-phase full-wave rectifying circuit serve as outputs thereof.

CITATION LIST

Patent Literature

Patent Literature 1: Japanese Unexamined Patent Application Publication No, 7-308069 (paragraph [0009], FIG. 1)

DISCLOSURE OF INVENTION

Technical Problem

However, such a three-phase AC to DC converter in related art determines whether to turn on or turn off the switching devices on the basis of the current values of the respective phases detected by a current sensor. Therefore, the three-phase AC to DC converter in related art has low followability with respect to voltage changes, and is susceptible to the sensor characteristics such as frequency response and temperature drift. This results in harmonic leakage current and generation of noise. Furthermore, the current sensor is often a through-type current sensor. In this case, the current path to be measured needs to be inserted through the current sensor, resulting in an increase in the mounting cost and the cost of the sensor itself.

These problems become more pronounced particularly in the case where the three-phase AC to DC converter is applied to apparatuses having an inverter load, such as air-conditioning apparatuses.

FIG. 10 is a circuit diagram of a three-phase AC to DC converter with a load connected thereto. More specifically, FIG. 10 is a circuit diagram wherein an inverter load 101 is connected as a load so as to drive a motor 102 of a compressor installed in an air-conditioning apparatus. Typically, the compressor is attached to a metal casing of an outdoor unit of the air-conditioning apparatus, and therefore a casing of the compressor is connected to ground. Further, a coil of the motor 102 of the compressor is placed in a refrigerant that is circulating for cooling, and therefore a large stray capacitance Cm is produced between the coil of the motor and the casing (ground). Accordingly, in the case where the variation of the voltage to ground in a DC section of the inverter is large, the current flows to the ground through the stray capacitance Cm, and therefore the leakage current and noise terminal voltage are remarkably increased.

The invention has been made to overcome the above problems, and aims to provide a three-phase AC to DC converter capable of reducing harmonic leakage current and the noise level, and an air-conditioning apparatus using the three-phase AC to DC converter.

Solution to Problem

A three-phase AC to DC converter according to the invention includes a three-phase AC power supply, a three-phase rectifier bridge circuit that is connected to the three-phase AC power supply and that includes rectifying devices which are connected in a bridge configuration between two DC buses, a three-phase full-bridge circuit that includes two serially-connected switching devices for each of three phases, the two serially-connected switching devices being connected between the DC buses at an output side of the three-phase rectifier bridge circuit, and that includes reverse blocking diodes which are connected in parallel to the respective switching devices, a reactor that connects a connection point between the two serially-connected switching devices of each phase to a corresponding phase of the three-phase AC power supply, a smoothing capacitor connected between the DC buses at an output side of the three-phase full-bridge circuit. DC voltage detection means that detects an output voltage between the DC buses, power supply phase detection means that detects a power supply phase of the three-phase AC power supply, and pulse width modulation means that outputs PWM signals which control the switching devices, wherein the pulse width modulation means outputs the PWM signals on the basis of the power supply phase and the output voltage.

Advantageous Effects of Invention

According to the invention, it is possible to provide a three-phase AC to DC converter capable of reducing harmonic leakage current and the noise level, and an air-conditioning apparatus using the three-phase AC to DC converter.

REFERENCE SIGNS LIST 1 three-phase AC power supply, 2 three-phase rectifier bridge circuit, 2a-2f diode, 3 three-phase full-bridge circuit, 3a-3f FET, 4a-4f reverse blocking diode, 5 reactor, 6 smoothing capacitor, 7 load, 8 power supply phase detection means, 9 DC voltage detection means, 10 pulse width modulation means, 11 input side resistor, 12 light-emitting diode, 13 diode, 14 constant-voltage power supply, 15 output side resistor, 16 phototransistor, 17 voltage waveform of three-phase AC power supply, 18 emitter potential waveform of phototransistor, 19 waveform of upper DC bus voltage, 20 waveform of lower DC bus voltage, 21 reference signal, 22 triangular wave, 23 PWM signal, 101 inverter load, 102 motor.

BEST MODE FOR CARRYING OUT THE INVENTION

Embodiment 1

Figure 1:
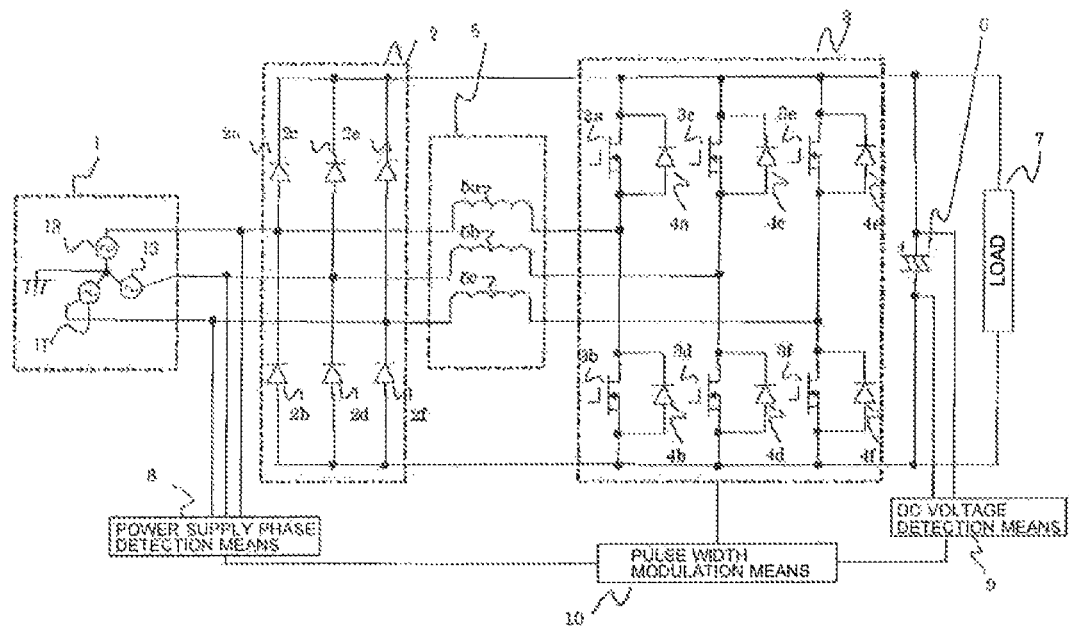
FIG. 1 is a circuit diagram of a three-phase AC to DC converter according to Embodiment 1.

FIG. 1 is a circuit diagram of a three-phase AC to DC converter according to Embodiment 1.

Referring to FIG. 1, a three-phase AC power supply 1 is equivalent to AC power supplies 1R, 1S, and 1T for single phases that are connected in star connection, in which a neutral point of the star connection is connected to ground. The phases of voltages output from these AC power supplies 1R through 1T are shifted by 120 degrees from each other, and the respective AC power supplies output an R-phase voltage, an S-phase voltage, and a T-phase voltage.

A three-phase rectifier bridge circuit 2 includes six diodes 2a through 2f as rectifying devices that are connected in a bridge configuration. The diodes 2a, 2c, and 2e are respectively connected in series to the diodes 2b, 2d and 2f. Cathode sides of the diodes 2a, 2c, and 2e are connected to an upper DC bus, while anode sides of the diodes 2b, 2d, and 2f are connected to a lower DC bus. The upper DC bus is one of DC buses, which is located at a high voltage output side. The lower DC bus is another one of DC buses, which is located at a low voltage output side.

Further, an anode side of the diode 2a (i.e., a cathode side of the diode 2b) is connected to the output from the AC power supply 1R. Similarly, an anode side of the diode 2c (i.e., a cathode side of the diode 2d) is connected to the output from the AC power supply 1S, and an anode side of the diode 2e (i.e., a cathode side of the diode 2f) is connected to the output from the AC power supply 1T.

A three-phase full-bridge circuit 3 includes six FETs 3a through 3f as switching devices that are connected in a bridge configuration, and reverse blocking diodes 4a through 4f that are each connected in parallel to the corresponding one of the FETs. The FETs 3a, 3c, and 3e are respectively connected in series to the FETs 3b, 3d, and 3f. Drain sides of the FETs 3a, 3c, and 3e are connected to the upper DC bus, while source sides of the FETs 3b, 3d, and 3f are connected to the lower DC bus (hereinafter a FET connected to the upper DC bus is referred to as an "upper arm FET", and a FET connected to the lower DC bus is referred to as a "lower arm FET"). Further, the source sides of the FETs are connected to anode sides of the reverse blocking diodes 4a through 4f, while the drain sides of the FETs are connected to cathode sides of the reverse blocking diodes 4a through 4f. It is to be noted that, although FETs (field-effect transistors) are illustrated as the switching devices FETs 3a through 3f, IGBTs (insulated gate bipolar transistors) may be used as the switching devices.

Further, the source side of the FET 3a (i.e., the drain side of the FET 3b) is connected to one end of a reactor 5a, and the other end of the reactor 5a is connected to the anode side of the diode 2a and hence to the AC power supply 1R. Similarly, the source side of the FET 3c (i.e., the drain side of the FET 3d) is connected to one end of a reactor 5b, and the other end of the reactor 5b is connected to the anode side of the diode 2c and hence to the AC power supply 1S. The source side of the FET 3e (i.e., the drain side of the FET 3f) is connected to one end of a reactor 5c, and the other end of the reactor 5c is connected to the anode side of the diode 2e and hence to the AC power supply 1T. Although not illustrated in detail, gate terminals of the FETs 3a through 3f are connected to pulse width modulation means 10 which will be described below. The FETs 3a and 3b control the current of R-phase; the FETs 3c and 3d control the current of S-phase; and the FETs 3e and 3f control the current of T-phase.

An output side of the three-phase full-bridge circuit 3 is connected to a smoothing capacitor 6, and an output side of the smoothing capacitor 6 is connected to a load 7. Although not illustrated in detail, the load 7 is typically an AC load connected through an inverter. For example, in an air-conditioning apparatus, the load 7 may be a motor that drives a compressor, a fan, and the like.

Power supply phase detection means 8 is connected to output sides of the AC power supplies 1R, 1S, and 1T so as to detect respective phases of the R-phase voltage, S-phase voltage, and T-phase voltage. DC voltage detection means 9 is connected to both ends of the smoothing capacitor 6 so as to detect a voltage applied to the smoothing capacitor 6. The pulse width modulation means 10 transmits control signals to the FETs 3a through 3f on the basis of the detection results of the power supply phase detection means 8 and the DC voltage detection means 9, and thereby drives the FETs 3a through 3f.

Figure 2:
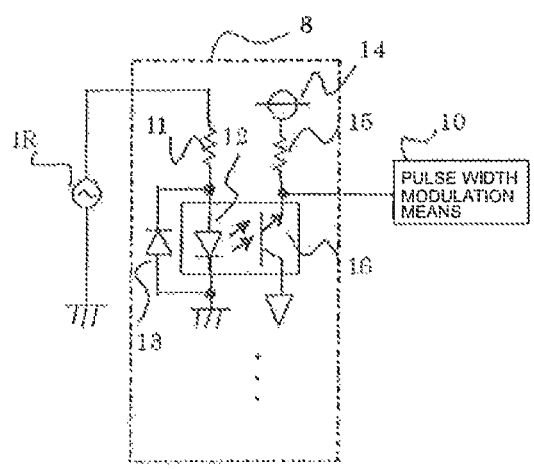
FIG. 2 is a diagram illustrating the circuit configuration of power supply phase detection means for one phase according to Embodiment 1.

FIG. 2 is a diagram illustrating the circuit configuration of the power supply phase detection means 8 for one phase according to Embodiment 1.

Referring to FIG. 2, the output of the AC power supply 1R is connected to one end of an input side resistor 11, and the other end of the input side resistor 11 is connected to an anode side of a light-emitting diode 12. A cathode side of the light-emitting diode 12 is connected to ground. Further, a diode 13 is connected in parallel to the light-emitting diode 12 such that opposite polarities are connected to each other.

A constant-voltage power supply 14 is connected to an emitter side of a phototransistor 16 through an output side resistor 15. Further, the phototransistor 16 is connected at a collector side thereof to ground, and is arranged such that the light from the light-emitting diode 12 is made incident on a base thereof. The emitter potential of the phototransistor 16 is output to the pulse width modulation means 10. That is, when the light from the light-emitting diode 12 is made incident on the phototransistor 16, the phototransistor 16 becomes conductive so as to output 0 V to the pulse width modulation means 10. On the other hand, when the light from the light-emitting diode 12 is not made incident on the phototransistor 16, the phototransistor 16 outputs the voltage of the constant-voltage power supply 14 to the pulse width modulation means 10.

It is to be noted that, although the circuit configuration for R-phase is illustrated in FIG. 2, the circuit configurations for S-phase and T-phase are similar to that for R-phase. Further, referring to FIG. 1, the power supply phase detection means 8 is connected to the pulse width modulation means 10 through a single line. However, in actuality, signals for three phases are output in Embodiment 1.

Since the phases of the three-phase AC power supply are shifted by 120 degrees from each other, the pulse width modulation means 10 may perform an operation of calculating, on the basis of an output for one phase, phases of the other phases. Alternatively, a dedicated device to perform this operation may be separately provided. Further alternatively, phase information of the respective phases may be multiplexed in the power supply phase detection means 8 using known means, such as a microcomputer and a digital circuit, so as to be output to the pulse width modulation means 10.

Next, a description will be given of operations.

(1) Operations of Power Supply Phase Detection Means 8

First, operations of the power supply phase detection means 8 will be described with reference to FIGS. 2 and 3.

Referring to FIG. 2, when the voltage of the AC power supply 1R is positive, the light-emitting diode 12 is brought into a conductive state so as to emit light. At this point, the phototransistor 16 is also brought into a conductive state, so that the emitter potential becomes 0 V (hereinafter referred to as "L state"). On the other hand, when the voltage of the AC power supply 1R is negative, although the diode 13 is brought into a conductive state, the light-emitting diode 12 is brought into a non-conductive state and does not emit light. At this point, the phototransistor 16 is also brought into a non-conductive state, so that a potential equal to the potential of the constant-voltage power supply appears at the emitter (hereinafter referred to as "H state"). Accordingly, the emitter potentials are brought into L state when the respective AC power supplies are positive, and the emitter potentials are brought into H state when the respective AC power supplies are negative.

Figure 3:
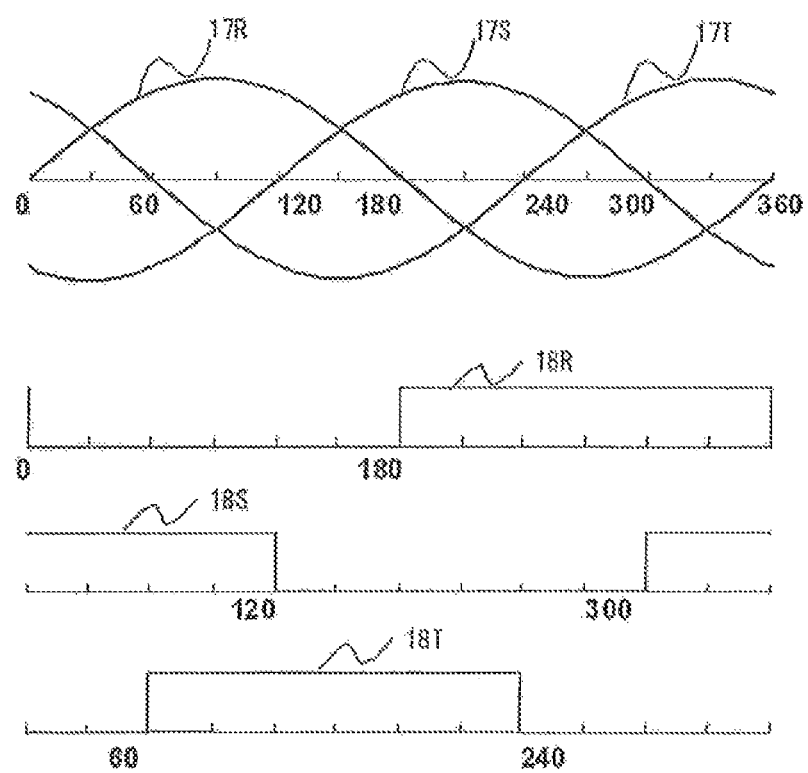
FIG. 3 is a waveform diagram illustrating a three-phase alternating voltage and an output of the power supply phase detection means according to Embodiment 1.

FIG. 3 is a waveform diagram illustrating the three-phase alternating voltage and an output of the power supply phase detection means according to Embodiment 1. The waveform diagram shows relationships between voltages 17R, 17S, and 17T of the respective phases of the three-phase AC power supply 1 (i.e., voltages of the AC power supplies 1R through 1T) and respective emitter potentials 18R, 18S, and 18T of the phototransistor 16 (i.e., outputs of the respective phases to the pulse width modulation means 10). Referring to FIG. 3, the horizontal axis represents the phase, and the vertical axis represents the voltage.

When the R-phase voltage 17R is positive, the R-phase emitter potential 18R is in an L state. When the R-phase voltage 17R is negative, the R-phase emitter potential 18R is in an H state. The same applies to the other phases. However, as mentioned above, since the phases of the AC power supplies 1R, 1S, and 1T are shifted by 120 degrees from each other (more specifically, the S-phase voltage is delayed by 120 degrees from the R-phase voltage, and the T-phase voltage is delayed by 120 degrees from the S-phase voltage), the emitter potentials are also shifted by 120 degrees from each other.

The pulse width modulation means 10 can determine in which sections of 60 degrees the phase of the three-phase AC power supply 1 is, on the basis of the state change of the emitter potentials of the respective phases.

For example, when the R-phase emitter potential is changed from the H state to the L state (i.e., falls), the phase becomes 0 degree. Thus, the phase is determined to be brought into the section of 0 through 60 degrees. Further, when the R-phase emitter potential is changed from the L state to the H state (i.e., rises), the phase becomes 60 degree. Thus, the phase is determined to be brought into the section of 60 through 120 degrees. Determination of other sections can be made in the same manner. This is summarized in a table as shown in Table 1.

TABLE 1

| | section | | | | | |
|---|---|---|---|---|---|---|
| | 1 | 2 | 3 | 4 | 5 | 6 |
| phase conditions | 0-60 R-phase fall | 60-120 T-phase rise | 120-180 S-phase fall | 180-240 R-phase rise | 240-300 T-phase fall | 300-360 S-phase rise |

The above determination may be made on the basis of the state itself in place of the state change of the emitter potential. For example, when only the S-phase emitter potential is in the H state, the phase is determined to be in Section 1 of 0 through 60 degrees. Further, when only the R-phase emitter potential is in L state, the phase is determined to be in Section 2 of 60 through 120 degrees. Determination of other sections can be made in the same manner. This is summarized in a table as shown in Table 2.

TABLE 2

| | section | | | | | |
|---|---|---|---|---|---|---|
| | 1 | 2 | 3 | 4 | 5 | 6 |
| phase conditions | 0-60 Only S-phase is in H state | 60-120 Only R-phase is in L state | 120-180 Only T-phase is in H state | 180-240 Only S-phase is in L state | 240-300 Only R-phase is in H state | 300-360 Only T-phase is in L state |

(2) Operations of Entire Three-Phase AC to DC Converter Circuit

In the following, operations of the entire three-phase AC to DC converter circuit will be described.

Figure 4:
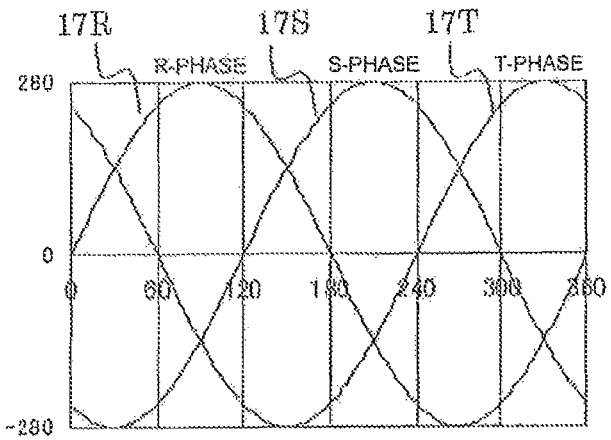
FIG. 4 is a diagram illustrating a relationship of the power supply voltages of the respective phases with respect to FETs to be PWM-controlled and reactors to be energized according to Embodiment 1.

FIG. 4 is a diagram illustrating a relationship of the power supply voltages of the respective phases with respect to FETs to be PWM-controlled and reactors to be energized according to Embodiment 1. Referring to FIG. 4, during Section 1 (phase is in a range of 0 through 60 degrees), the pulse width modulation means 10 outputs PWM signals to the gates of the FET 3b and FET 3f.

In Section 1, since only the S-phase voltage is negative and the R-phase voltage and the T-phase voltage are positive, currents flow from R-phase to S-phase, and from T-phase to S-phase, respectively. In this case, the current flows through the following route in accordance with ON and OFF of the FET 3b and FET 3f.

(When FET 3b is ON)
AC power supply 1R→reactor 5a→FET 3b→diode 2d→AC power supply 1S
(When FET 3b is OFF)
AC power supply 1R→reactor 5a→reverse blocking diode 4a→smoothing capacitor 6→diode 2d→AC power supply 1S That is, when the FET 3b is ON, the R and S power supplies are short-circuited through the reactor 5a, so that electromagnetic energy is accumulated into the reactor 5a. On the other hand, when the FET 3b is OFF, the electromagnetic energy stored in the reactor 5a is released and superimposed on the AC voltage. Thus, the smoothing capacitor 6 is charged with this AC voltage. It is to be noted that, since the S-phase voltage is negative, the diode 2d is conductive. Therefore, the current does not flow through the reactor 5b.

Further, as describe below, the flow of the current between the T-phase and S-phase is similar to the above, and the smoothing capacitor 6 is charged through accumulation and release of electromagnetic energy in the reactor 5c.
(When FET 3f is ON)
AC power supply 1T→reactor 5c→FET 3f→diode 2d→AC power supply 1S
(When FET 3f is OFF)
AC power supply 1T→reactor 5c→reverse blocking diode 4e→smoothing capacitor 6→diode 2d→AC power supply 1S Further, during Section 1, since the diode 2d is conductive, a voltage equal to an AC voltage 1S appears in the lower DC bus.

Then, in Section 2, since only the R-phase voltage is positive and the S-phase voltage and the T-phase voltage are negative, currents flow from R-phase to S-phase, and from R-phase to T-phase, respectively. In this case, in the same manner as described above, current flows through the following route in accordance with ON and OFF of the FET 3c and FET 3e.
(When FET 3c is ON)
AC power supply 1R→diode 2a→FET 3c→reactor 5b→AC power supply 1S
(When FET 3c is OFF)
AC power supply 1R→diode 2a→smoothing capacitor 6→reverse blocking diode 4d→reactor 5b→AC power supply 1S
(When FET 3e is ON)
AC power supply 1R→diode 2a→FET 3e→reactor 5c→AC power supply 1T
(When FET 3e is OFF)
AC power supply 1R→diode 2a→smoothing capacitor 6→reverse blocking diode 4f→reactor 5c→AC power supply 1T Further, during Section 2, since the diode 2a is conductive, a voltage equal to an AC voltage 1R appears in the upper DC bus.

Similar operations are performed in Section 3 and the subsequent sections. According to Embodiment 1, if the voltage of one of the three phases is negative, the lower arm FETs of the other two phases are PWM-controlled. Also, if the voltage of one of the three phases is positive, the upper arm FETs of the other two phases are PWM-controlled. Thus, an increased DC bus voltage is generated.

As described above. FETs to be controlled by the pulse width modulation means 10 are changed from section to section. However, since the FETs are controlled in accordance with the output of the power supply phase detection means 8 which has high followability with respect to changes in the power supply voltage, the harmonic leakage current and the noise level are reduced.

Figure 5:
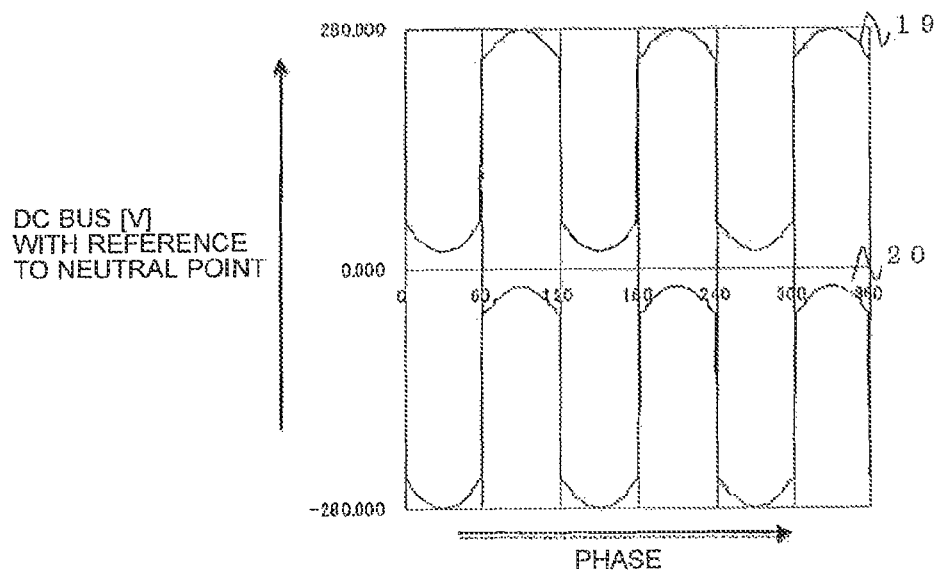
FIG. 5 is a waveform diagram illustrating a DC bus voltage according to Embodiment 1.

FIG. 5 is a waveform diagram illustrating the variation of the DC bus voltage over time according to Embodiment 1. As shown in FIG. 5, variations of voltage of a waveform 19 of the upper DC bus voltage and a waveform 20 of the lower DC bus voltage with reference to the neutral point are limited to fluctuation in each 60-degree section regardless of switching operation. It is to be noted that FIG. 5 shows the case where the line-to-line voltage of the three-phase AC power supply in which the neutral point of the star connection is connected to ground is 200 V, and the control target of the DC voltage is 300 V (a value greater than the peak value, √2×200 V, of the line-to-line voltage). In the case where the S-phase is connected to ground and in the case where the neutral point (open delta connection) between lines neutral is connected to ground, the same effect of reducing the ground bounce is attained.

(3) Method of Generating Reference Signal of PWM Signal

Figure 6:
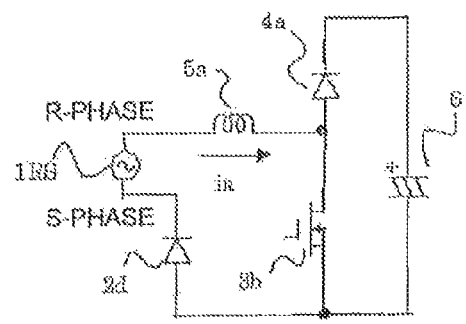
FIG. 6 is a partial circuit diagram illustrating energizing a path of R-phase and S-phase according to Embodiment 1.

FIG. 6 is a partial circuit diagram illustrating energizing path of R-phase and S-phase according to Embodiment 1. Referring to FIG. 6, the same elements as those in FIG. 1 are denoted by the same reference numerals. Further, the phase-to-phase voltage between R-phase and S-phase is replaced with a single equivalent power supply, and is represented as a phase-to-phase voltage 1RS. It is assumed that, in order to reduce the harmonic current, FETs are controlled such that a current iR flowing through R-phase has a sine wave shape. In this case, the waveform as a control target is expressed by [Math. 1], where I is the amplitude of the current iR, ω is the angular frequency, and t is time. It is to be noted that the angular frequency can be calculated by: ω=2πf, where f is the frequency of the AC power supply. Further, the relationship θ=ωt is satisfied where θ is the power supply phase.

$$i_R = I \sin \omega t \quad \text{[Math. 1]}$$

Further, the phase voltages of R-phase, S-phase, and T-phase are displaced from each other by 120 degrees (2π/3 [rad]), and therefore are expressed by [Math. 2], where VR, VS, and VT represent the phase voltages of R-phase, S-phase, and T-phase, respectively, and V is the amplitude of the respective phase voltages.

$$v_R = V \sin \omega t \quad \text{[Math. 2]}$$
$$v_S = V \sin\left(\omega t - \frac{2\pi}{3}\right)$$
$$v_T = V \sin\left(\omega t - \frac{4\pi}{3}\right) = V \sin\left(\omega t + \frac{2\pi}{3}\right)$$

Generally, the relationship between the voltage v applied to the inductance L and the current i is expressed by [Math. 3].

$$i = \frac{1}{L} \int v \, dt \quad \text{[Math. 3]}$$

The voltage v applied to the inductance L is a phase-to-phase voltage. The variation of the phase-to-phase voltage over time differs in accordance with phase lead or lag between phases. For instance, in the case of controlling the current of R-phase, in Section 1 and Section 4, the phase-to-phase voltage applied to the inductance 5a is vRS=vR−vS. However, since the voltage of S-phase lags with respect to the voltage of R-phase by 120 degrees, the phase-to-phase voltage can be expressed by [Math. 4].

$$v_{RS} = V(\sin\omega t - \sin(\omega t - 2\pi/3))$$ [Math. 4]
$$= V(\sin\omega t + \sin(\omega t - 2\pi/3 + \pi))$$
$$= V(\sin\omega t + \sin(\omega t + \pi/3))$$
$$= V \cdot 2\cos(-\pi/6) \cdot \sin(\omega t + \pi/6)$$
$$= \sqrt{3}\, V \sin(\omega t + \pi/6)$$

Further, in the case of controlling the current of R-phase, in Section 3 and Section 6, the phase-to-phase voltage applied to the inductance $5a$ is vRT=vR−vT. However, since the voltage of T-phase leads the voltage of R-phase by 120 degrees, the phase-to-phase voltage can be expressed by [Math. 5].

$$v_{RT} = V(\sin\omega t - \sin(\omega t + 2\pi/3))$$ [Math. 5]
$$= V(\sin\omega t + \sin(\omega t + 2\pi/3 - \pi))$$
$$= V(\sin\omega t + \sin(\omega t - \pi/3))$$
$$= V \cdot 2\cos(\pi/6) \cdot \sin(\omega t - \pi/6)$$
$$= \sqrt{3}\, V \sin(\omega t - \pi/6)$$

Accordingly, when PWM control is performed using, as a reference signal, a coefficient $\alpha$ that satisfies [Math. 6] in Sections 1 and 4 and [Math. 7] in Sections 3 and 6, the current of R-phase can be controlled to have a sine wave shape.

$$i_R = \frac{1}{L}\int \alpha \cdot v_{RS}\, dt$$ [Math. 6]

$$i_R = \frac{1}{L}\int \alpha \cdot v_{RT}\, dt$$ [Math. 7]

The reference signal $\alpha$ is calculated by substituting [Math. 1], [Math. 4], and [Math. 5] into each of [Math. 6] and [Math. 7] and using approximation that vRS and vRT are constant in micro time $\Delta t$, so that [Math. 8] and [Math. 9] are obtained.

$$\alpha = \frac{LI}{\sqrt{3}\, V\Delta t}\frac{\sin\omega t}{\sin(\omega t + \pi/6)} \propto \frac{\sin\omega t}{\sin(\omega t + \pi/6)}$$ [Math. 8]

$$\alpha = \frac{LI}{\sqrt{3}\, V\Delta t}\frac{\sin\omega t}{\sin(\omega t - \pi/6)} \propto \frac{\sin\omega t}{\sin(\omega t - \pi/6)}$$ [Math. 9]

Accordingly, in Sections 1 and 4 where the phase-to-phase voltage between the phase to be controlled and the phase delayed by 120 degrees with respect thereto is applied to the reactor of the phase to be controlled, a reference signal proportional to sin ωt/sin(ωt+π/6) is used. On the other hand, in Sections 3 and 6 where the phase-to-phase voltage between the phase to be controlled and the phase advanced by 120 degrees with respect thereto is applied to the reactor of the phase to be controlled, a reference signal proportional to sin ωt/sin(ωt−π/6) is used. Thus, the current of R-phase can be controlled to have a substantially sine wave shape. It is to be noted that the amplitude of the reference signal may be determined using a known control method such that the DC voltage detected by the DC voltage detection means 9 and the target value of the DC voltage is reduced.

It is to be noted that, the variation range of the power supply phase θ (i.e., ωt) in [Math. 8] and [Math. 9] is one period of 0 through 2π (0 through 360 degrees). However, as shown below, if the variation range of the power supply phase θ is set to the above-described sections of 60 degrees each, the reference signal can be more easily generated.

More specifically, no change is made to [Math. 8] with regard to Section 1. However, with regard to Section 3, which starts from 120 degrees (2π/3) in the entire period, ωt is replaced with ωt+2π/3 in [Math. 9], so that [Math. 10] is obtained.

$$\alpha \propto \frac{\sin(\omega t + 2\pi/3)}{\sin(\omega t + \pi/2)}$$ [Math. 10]

Further, in [Math. 8] and [Math. 9], sin α=−sin(α+π) holds, and a sin function appears in both the numerator and denominator. This indicates that [Math. 8] and [Math. 9] are functions each having a period of π. Accordingly, [Math. 8] is applicable to Section 1 and Section 4 which is phase-shifted therefrom by 180 degrees, and [Math. 10] is applicable to Section 3 and Section 6 which is phase-shifted by 180 degrees.

As can be seen from the above, in the case where the variation range of the power supply phase θ is divided into the above-described sections of 60 degrees each, if a reference signal proportional to sin ωt/sin(ωt+π/6) is used in Sections 1 and 4 where the phase-to-phase voltage between the phase to be controlled and the phase delayed 120 degrees with respect thereto is applied to the reactor of the phase to be controlled, and if a reference signal proportional to sin(ωt+2π/3)/sin(ωt+π/2) is used in Sections 3 and 6 where the phase-to-phase voltage between the phase to be controlled and the phase advanced by 120 degrees with respect thereto is applied to the reactor to be controlled, the current of R-phase can be controlled to have a substantially sine wave shape. It is to be noted that the amplitude of the reference signal may be using a known controlled such that the DC voltage detected by the DC voltage may be selected using a known control method such that the difference between the DC voltage detected by the DC voltage detection means 9 and the target value of the DC voltage is reduced.

Figure 7:
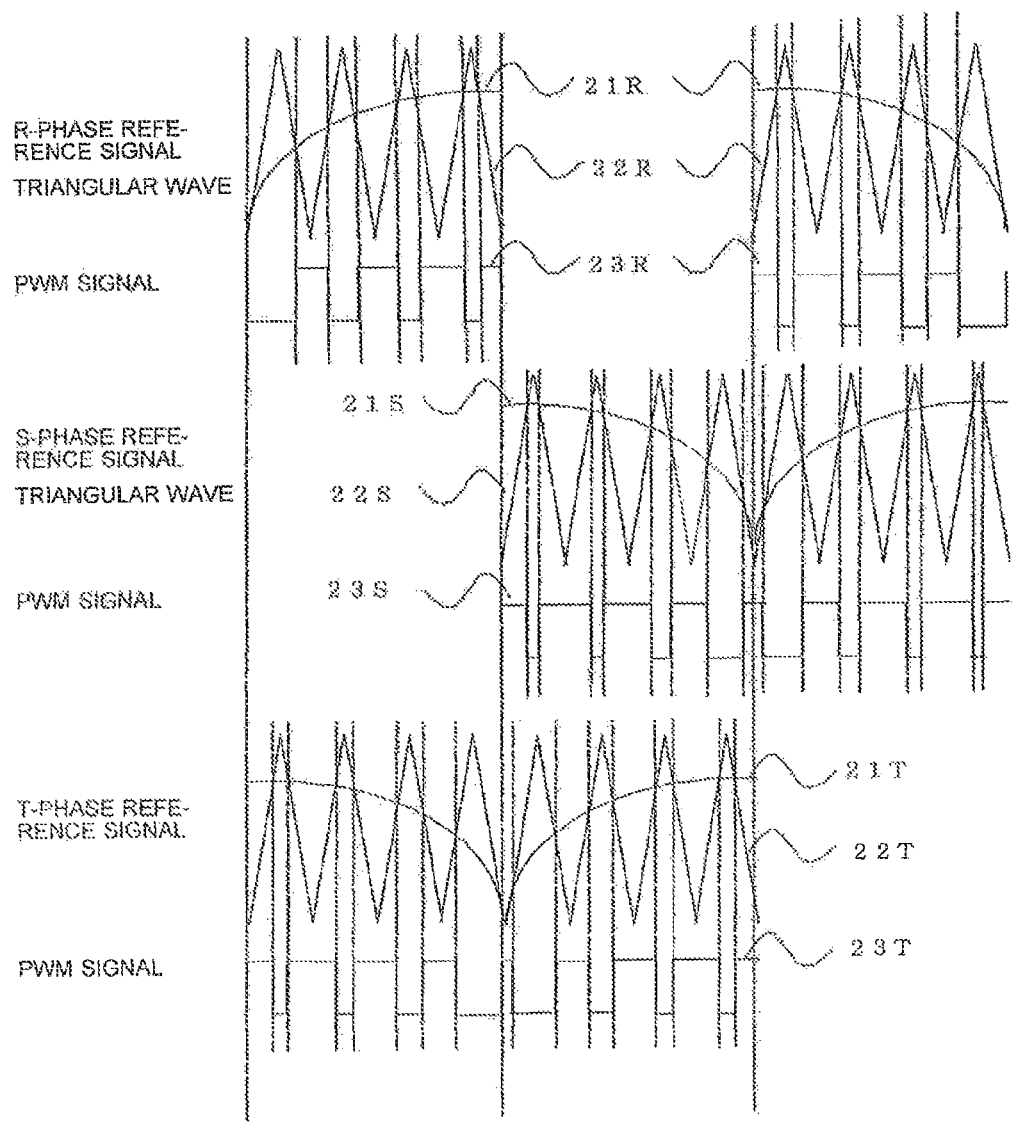
FIG. 7 is a waveform diagram illustrating reference signals of the respective phases, triangular waves, and PWM signals generated based thereon according to Embodiment 1.

FIG. 7 is a waveform diagram illustrating reference signals 21R through 21T and of the respective phases, triangular waves 22R through 22T, and PWM signals 23R through 23T generated based thereon according to Embodiment 1. As shown in FIG. 7, the pulse width modulation means 10 outputs a PWM signal such that the PWM signal is turned ON in the sections where the reference signal is greater than the triangular wave, and that the PWM signal is turned OFF in the sections where the reference signal is less than the triangular wave.

According to Embodiment 1, since the followability with respect to voltage changes is improved by performing the PWM control on the basis of the phase detected by the phase detection means, it is possible to obtain a three-phase AC to DC converter capable of reducing harmonic leakage current and the noise level. Also, since the phase detection means is formed of diodes and a photo coupler, it is possible to detect the power supply phase by using a simple and inexpensive circuit. Also, since the transistor of the photo coupler is not used for analog operations in the unsaturated region, but is user for switching operations in the saturated region, it is possible to reduce adverse effects on the transfer characteristics due to the variations in the device characteristics and the changes over time.

Further, the switching control is performed with a simple configuration based only on the input power supply phase and the DC bus voltage value, and therefore can be realized with a small number of sensors and an inexpensive microcomputer. In particular, since the reference signal used for PWM control for making the input current have a substantially sine wave shape is expressed by a simple expression in which the phase is the only variable, the associated circuits such as a sensor as well as software installed in the microcomputer are simplified, so that an inexpensive configuration can be realized. Further, since the phase is the only variable, the reference signal is a stable and repetitive output. Therefore, although precise accuracy with respect to power-supply variations, load variations, or the like might not be obtained, there is no need to perform additional protection control against overcurrent in a transient response upon feedback of current or the like. Therefore, this system is simple and inexpensive in this regard as well.

Further, since the phase detection means has high followability, the switching operation of the FETs can be performed at a higher speed. Since the switching operation of the FETs can be performed at a higher speed, the controllable range of the target voltage value can be increased. Furthermore, since the switching operation of the FETs can be performed at a higher speed, the inductance value of the reactor can be reduced, which makes it possible to reduce the size of the reactor.

However, in the circuit configuration according to Embodiment 1, if switching devices are operated at a high speed, there arises a new problem of increased heat generation by the switching devices. The circuit configuration in related art does not have this problem because, in the first place, it is not possible to operate switching devices at a high speed with the circuit configuration in related art.

In this case, a wide bandgap semiconductor such as SiC (silicon carbide) may be used as a switching device. A wide bandgap semiconductor is a semiconductor that uses a device having a greater bandgap than a Si device. Examples of wide bandgap semiconductors include SiC, GaN (gallium nitride), and a diamond device.

The wide bandgap semiconductor can operate at a high speed, and has a higher heat-resistant temperature than Si devices. Accordingly, if wide bandgap semiconductors are used as the switching devices in the circuit configuration of Embodiment 1, it becomes possible to operate switching devices at a high speed. Further, since the wide bandgap semiconductor has a higher heat-resistant temperature than a Si device, it becomes possible to reduce the size of a radiator fin or to realize a configuration without a radiator fin.

In the case where a wide bandgap semiconductor such as SiC is used, from the viewpoint of emission regulations on EMC such as noise terminal voltage (e.g., EN61000-6-3: 2007, J55014-1 (H20), and VCCI (2008.4) Class A), the carrier frequency of the triangular wave that generates a PWM signal may be set such that the carrier frequency and a sideband wave thereof do not overlap the frequencies specified in the regulations. For instance, since the lower limit frequency set by the noise terminal voltage regulations is 150 kHz, the carrier frequency of the triangular wave that generates a PWM signal may be set to about 73 kHz, which is less than one-half of 150 kHz, about 49 kHz, which is less than one-third of 150 kHz, or about 36 kHz, which is less than one-fourth of 150 kHz, such that the sideband wave having a frequency equal to an integral multiple of the carrier frequency becomes slightly less than 150 kHz.

It is to be noted that, since the three-phase AC to DC converter of Embodiment 1 can reduce harmonic leakage current and the noise level, if this three-phase AC to DC converter is applied to electrical equipment, such as an air-conditioning apparatus, having an inverter load, it is possible to reduce the current flowing to the ground through a stray capacitance Cm, and therefor to reduce leakage current and the noise terminal voltage.

The triangular waves used for generation of PWM signals may be triangular waves having phases opposite to each other in two phases where switching operations are performed. Although the current flowing through the rectifying bridge circuit is the sum of the currents flowing in these respective phases, since these phases have phase opposite to each other, current ripples also have phases opposite to each other. Thus, the distorted current can be reduced.

Although the PWM control using a simple system is illustrated in the above description, if tracking control based on feedback of the input current is used, unbalance and distortion of the input power supply voltage can be handled, making it possible to perform control with higher accuracy. In this case, the cost and the complexity are increased. Accordingly, the cost effectiveness may be selected in accordance with the load capacity, the regulation value, and the effects on the ambient environment. Further, although the frequency of the triangular wave to be compared with the reference signal upon generation of a PWM control signal may be a fixed frequency, the frequency may be made variable by having frequency jitter, for example. In this case, frequency dispersion is achieved while preventing the radiation noise from the main circuit from concentrating on a certain frequency. Thus, the peak of the radiation noise can be reduced.

Embodiment 2

Figure 8:
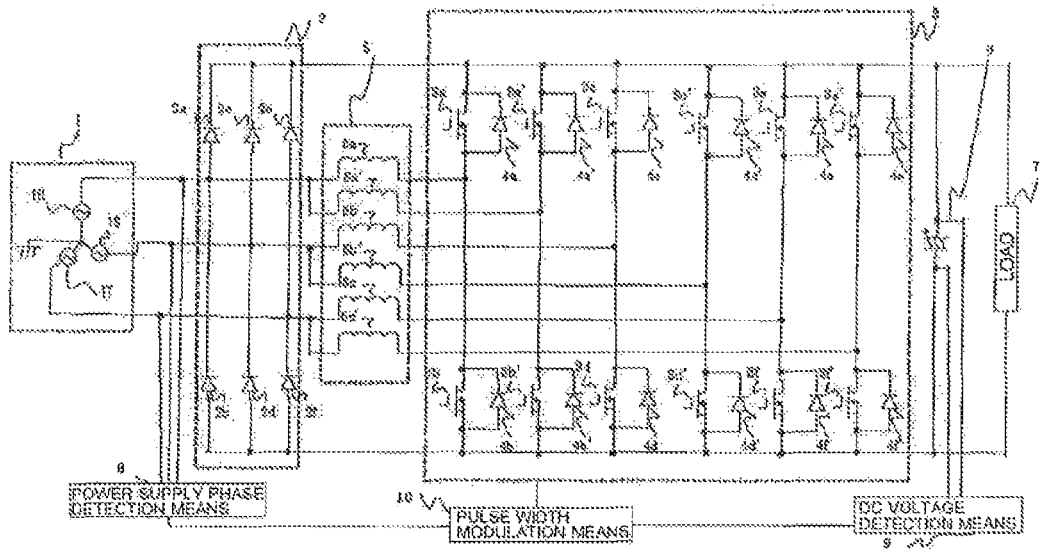
FIG. 8 is a circuit diagram of a three-phase AC to DC converter according to Embodiment 2.

FIG. 8 is a circuit diagram of a three-phase AC to DC converter according to Embodiment 2.

In FIG. 8, the same elements as those in FIG. 1 are denoted by the same reference numerals. The differences from FIG. 1 are that: in a three-phase full-bridge circuit 3, FETs $3a'$ through $3f'$ are added and connected in a bridge configuration, and reverse blocking diodes $4a'$ through $4f'$ are connected in parallel to the added respective FETs; and the added FETs are connected to a three-phase rectifier bridge circuit through reactors $5a'$ through $5c'$.

More specifically, the FETs $3a'$, $3c'$ and $3e'$ are respectively connected in series to the FETs $3b'$, $3d'$ and $3f'$. Drain sides of the FETs $3a'$, $3c'$ and $3e'$ are connected to an upper DC bus, while source sides of FETs $3b'$, $3d'$ and $3f'$ are connected to a lower DC bus. Further, the source sides of the FETs $3a'$ through $3f'$ are connected to anode sides of the reverse blocking diodes $4a'$ through $4f'$, while the drain sides of the FETs $3a'$ through $3f'$ are connected to cathode sides of the reverse blocking diodes $4a'$ through $4f'$.

Further, the source side of the FET $3a'$ (i.e., the drain of the FET $3b'$) is connected to one end of the reactor $5a'$, and the other end of the reactor $5a'$ is connected to the anode side of the diode $2a$. Similarly, the source side of the FET $3c'$ (i.e., the drain of the FET $3d'$) is connected to one end of the reactor $5b'$, and the other end of the reactor $5b'$ is connected to the anode side of the diode $2c$. The source side of the FET $3e'$ (i.e., the drain of the FET $3f'$) is connected to one end of the reactor $5c'$, and the other end of the reactor $5c'$ is connected to the anode side of the diode $2e$. Although not illustrated in detail, gate terminals of the FETs $3a'$ through $3f'$ are connected to pulse width modulation means 10.

Although the operations are substantially the same as those of Embodiment 1, there is a difference in that, upon generating PWM signals for controlling FETs that are connected in parallel in each phase, PWM signals are generated based on triangular waves having phases opposite to each other. It is to be noted that, although R-phase will be described below, the same applies to the other phases.

Figure 9:
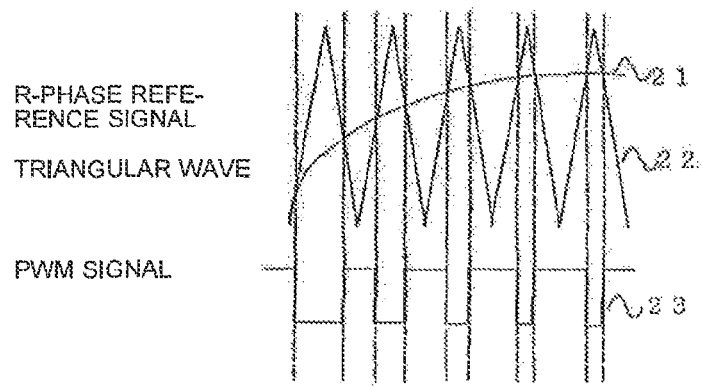
FIG. 9 is a waveform diagram illustrating reference signals, triangular waves, and PWM signals generated based thereon according to Embodiment 2.
Figure 9:
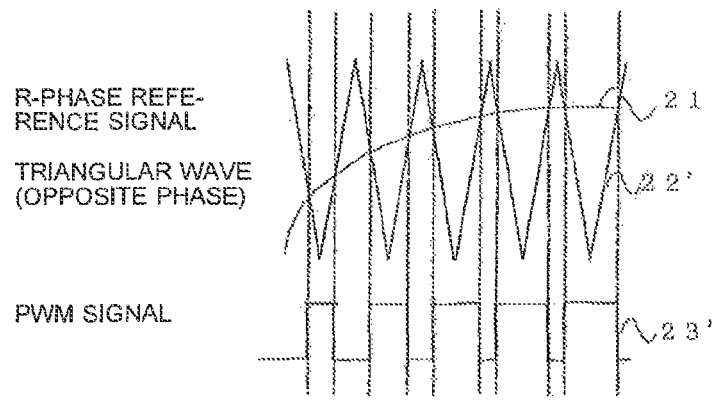
Figure 10:
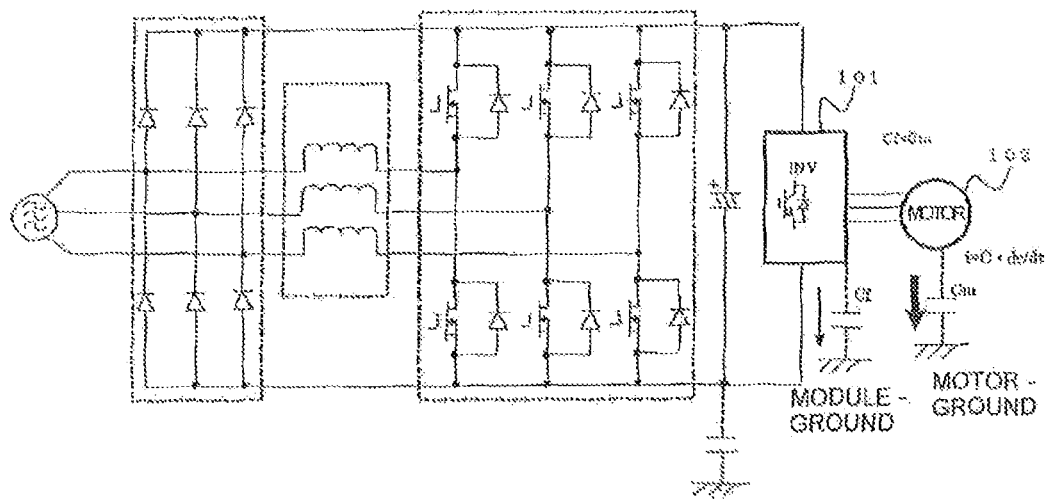
FIG. 10 is a circuit diagram illustrating a three-phase AC to DC converter with a load connected thereto.

FIG. 9 is a waveform diagram illustrating a reference signal 21 of the R-phase, triangular waves 22 and 22', and PWM signals 23 and 23' generated based thereon according to Embodiment 2. The triangular wave 22 and triangular wave 22' have phases opposite to each other. As shown in FIG. 9, the pulse width modulation means 10 outputs a PWM signal such that the PWM signal is turned ON in the sections where the reference signal is greater than the triangular wave, and that the PWM signal is turned OFF in the sections where the reference signal is less than the triangular wave.

Among PWM signals generated in the manner described above, the PWM signal 23 is output so as to control the FET 3a or 3b, and the PWM signal 23' is output so as to control the FET 3a' or 3b'. Since the triangular waves to be used for generation of PWM signals have phases opposite to each other, and since the PWM signals are generated on the basis thereof, the parallelly-connected FETs generally alternately perform switching operations. For example, when the FET 3a is in an ON sate, the FET 3a' is in an OFF state. Conversely, when the FET 3a is an OFF state, the FET 3a' is in an ON state.

It is to be noted that, although a set of two parallelly-connected FETs is used for control a single phase in Embodiment 2, a set of three or more parallelly-connected FETs may be used for controlling a single phase. In this case, a set of parallelly-connected FETs may be divided into two sub-sets such that the FETs in one of the sub-sets are controlled by the PWM signal 23 which is generated using the triangular wave 22 and such that the FETs in the other one of the sub-sets are controlled by the PWM signal 23' which is generated using the triangular wave 22' having a phase opposite to that of the triangular wave 22.

With this control, currents flowing through the parallelly-connected reactors 5a and 5a' have phases opposite to each other. Therefore, the ripple of the phase current of the three-phase AC supply power flowing as a resultant current thereof is reduced, which makes it possible to reduce the noise terminal voltage. Further, this makes it possible to reduce the size of the input filter circuit. Furthermore, since the diodes 4a through 4f and the diodes 4a' through 4f' are connected in parallel, the forward current flowing through the diodes is reduced by half. This makes it possible to reduce the recovery loss due to a reverse conducting current that is generated when the diodes are switched from a conductive state to a non-conductive state. This also makes it possible to reduce the radiation noise level.

INDUSTRIAL APPLICABILITY

The invention is widely applicable to apparatuses that convert a three-phase alternating current into a direct current. In particular, the invention is widely applicable to electric apparatuses having an inverter load, such as air-conditioning apparatuses, refrigerators, freezers, and heat pump water heaters.

The invention claimed is:

1. A three-phase AC to DC converter comprising:
a three-phase rectifier bridge circuit that is connected to the a three-phase AC power supply, and that includes rectifying devices which are connected in a bridge configuration between two DC buses;
a three-phase full-bridge circuit that includes two serially-connected switching devices for each of three phases, the two serially-connected switching devices being connected between the DC buses at an output side of the three-phase rectifier bridge circuit, and that includes reverse blocking diodes which are connected in parallel to the respective switching devices;
a reactor that connects a connection point between the two serially-connected switching devices of each phase to a corresponding phase of the three-phase AC power supply;
a smoothing capacitor connected between the DC buses at an output side of the three-phase full-bridge circuit;
a DC voltage detector that detects an output voltage between the DC buses;
a power supply phase detector that detects a power supply phase of the three-phase AC power supply; and
a pulse width modulator that outputs PWM signals which control the switching devices, wherein
the pulse width modulator outputs the PWM signals on the basis of the power supply phase and the output voltage, and
the pulse width modulator outputs the PWM signals by dividing into a case where only one phase of the three-phase AC power supply has a positive voltage and into a case where only one phase of the three-phase AC power supply has a negative voltage.

2. The three-phase AC to DC converter of claim 1, wherein the power supply phase detector includes:
a light-emitting diode connected to the three-phase AC power supply; and
a phototransistor that is connected to a constant-voltage power supply through a resistor and that is configured to perform switching operation in response to light emitted from the light-emitting diode.

3. The three-phase AC to DC converter of claim 1, wherein
in a case where only one phase of the three-phase AC power supply has a positive voltage, the pulse width modulator outputs the PWM signals to switching devices located at an upper arm side among the two serially-connected switching devices that control other two phases, and
in a case where only one phase of the three-phase AC power supply has a negative voltage, the pulse width modulator outputs the PWM signals to switching devices located at a lower arm side among the two serially-connected switching devices that control other two phases.

4. A three-phase AC to DC converter comprising:
a three-phase rectifier bridge circuit that is connected to a three-phase AC power supply, and that includes rectifying devices which are connected in a bridge configuration between two DC buses;
a three-phase full-bridge circuit that includes two serially-connected switching devices for each of three phases, the two serially-connected switching devices being connected between the DC buses at an output side of the three-phase rectifier bridge circuit, and that includes reverse blocking diodes which are connected in parallel to the respective switching devices;
a reactor that connects a connection point between the two serially-connected switching devices of each phase to a corresponding phase of the three-phase AC power supply;
a smoothing capacitor connected between the DC buses at an output side of the three-phase full-bridge circuit;
a DC voltage detection detector that detects an output voltage between the DC buses;

a power supply phase detector that detects a power supply phase of the three-phase AC power supply; and a pulse width modulator that outputs PWM signals which control the switching devices, wherein the pulse width modulator outputs the PWM signals on the basis of the power supply phase and the output voltage, and the pulse width modulator generates a reference signal proportional to an expression in which the power supply phase is an only variable, and outputs a PWM signal on the basis of a comparison between the reference signal and a triangular wave.

5. The three-phase AC to DC converter of claim 4, wherein in a case where one period of the power supply phase is divided into sections by 60 degrees each and a power supply phase for each section is denoted by θ, when a phase-to-phase voltage between a phase to be controlled and a phase delayed with respect thereto is applied to a reactor of the phase to be controlled, the reference signal is proportional to sin θ/sin(θ+30°); and when a phase-to-phase voltage between the phase to be controlled and a phase advanced with respect thereto is applied to the reactor of the phase to be controlled, the reference signal is proportional to sin(120°+θ)/sin(90°+θ).

6. The three-phase AC to DC converter of claim 1, wherein the three-phase full-bridge circuit includes a plurality of sets of the two serially-connected switching devices for each of the phases, the plurality of sets being connected in parallel to each other between the DC buses; and a connection point between the two serially-connected switching devices of each phase is connected to the corresponding phase of the three-phase AC power supply with the reactor.

7. The three-phase AC to DC converter of claim 6, wherein the pulse width modulator generates two of the PWM signals using triangular waves which have phases opposite to each other, one of the PWM signals controls half of switching devices included in the plurality of sets of the two serially-connected switching devices of one of the phases, and another one of the PWM signals controls switching devices included in the plurality of sets of the two serially-connected switching devices of the remaining one of the phases.

8. The three-phase AC to DC converter of claim 1, wherein the switching devices include wide bandgap semiconductors.

9. The three-phase AC to DC converter of claim 8, wherein the wide bandgap semiconductors are silicon carbide, a gallium nitride based material, or diamond.

10. An air-conditioning apparatus comprising:

a compressor including a motor connected to a three-phase AC to DC converter as a load of the three-phase AC to DC converter, the three-phase AC to DC converter including:

a three-phase rectifier bridge circuit that is connected to a three-phase AC power supply, and that includes rectifying devices which are connected in a bridge configuration between two DC buses;

a three-phase full-bridge circuit that includes two serially-connected switching devices for each of three phases, the two serially-connected switching devices being connected between the DC buses at an output side of the three-phase rectifier bridge circuit, and that includes reverse blocking diodes which are connected in parallel to the respective switching devices;

a reactor that connects a connection point between the two serially-connected switching devices of each phase to a corresponding phase of the three-phase AC power supply;

a smoothing capacitor connected between the DC buses at an output side of the three-phase full-bridge circuit;

a DC voltage detector that detects an output voltage between the DC buses;

a power supply phase detector that detects a power supply phase of the three-phase AC power supply; and a pulse width modulator that outputs PWM signals which control the switching devices, wherein the pulse width modulator outputs the PWM signals on the basis of the power supply phase and the output voltage, and the pulse width modulator outputs the PWM signals by dividing into a case where only one phase of the three-phase AC power supply has a positive voltage and into a case where only one phase of the three-phase AC power supply has a negative voltage.

\* \* \* \* \*